United States Patent
Parra et al.

(10) Patent No.: US 7,281,143 B2
(45) Date of Patent: Oct. 9, 2007

(54) METHOD OF CONTROLLING POWER BY A POWER CONTROLLER CONTROLLING A POWER SWITCH OF AN UNUSED COMMUNICATION INTERFACE

(75) Inventors: Fidol Joaquin Parra, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 422 days.

(21) Appl. No.: 10/678,175

(22) Filed: Oct. 6, 2003

(65) Prior Publication Data

US 2004/0122985 A1 Jun. 24, 2004

(30) Foreign Application Priority Data

Nov. 29, 2002 (JP) ............................. 2002-348069

(51) Int. Cl.
G06F 1/26 (2006.01)
(52) U.S. Cl. .................. 713/320; 713/300; 713/324
(58) Field of Classification Search ................ 713/300, 713/320, 324, 340, 330
See application file for complete search history.

(56) References Cited

U.S. PATENT DOCUMENTS

| | | | | |
|---|---|---|---|---|
| 5,987,553 A | * | 11/1999 | Swamy et al. | 710/301 |
| 6,023,357 A | * | 2/2000 | Miyasita | 398/139 |
| 6,028,984 A | * | 2/2000 | Kimball | 709/249 |
| 6,072,585 A | * | 6/2000 | Dutton et al. | 358/1.12 |
| 6,148,347 A | * | 11/2000 | Finch et al. | 710/14 |
| 6,170,028 B1 | * | 1/2001 | Wallach et al. | 710/302 |
| 6,192,434 B1 | * | 2/2001 | Wallach et al. | 710/302 |
| 6,233,689 B1 | * | 5/2001 | Allen et al. | 713/320 |
| 6,370,122 B1 | * | 4/2002 | Nussbaumer et al. | 370/264 |
| 6,859,135 B1 | * | 2/2005 | Elliott | 340/7.36 |
| 7,010,594 B2 | * | 3/2006 | Defosse | 709/224 |
| 2002/0016904 A1 | * | 2/2002 | Chrysanthakopoulos | 712/24 |
| 2003/0063592 A1 | * | 4/2003 | Seki et al. | 370/338 |
| 2003/0098777 A1 | * | 5/2003 | Taylor et al. | 340/5.61 |
| 2003/0133337 A1 | * | 7/2003 | Yamada et al. | 365/200 |
| 2003/0148777 A1 | * | 8/2003 | Watanabe et al. | 455/458 |
| 2004/0008633 A1 | * | 1/2004 | Youn | 370/254 |
| 2004/0038707 A1 | * | 2/2004 | Kim | 455/554.1 |

(Continued)

FOREIGN PATENT DOCUMENTS

JP 11-88352 A 3/1999

(Continued)

Primary Examiner—Chun Cao
Assistant Examiner—Malcolm D Cribbs
(74) Attorney, Agent, or Firm—Sughrue Mion, PLLC

(57) ABSTRACT

The wireless LAN access point comprises a CPU, a PCI bus connected to the CPU, a power source section 18 connected to the PCI bus, a wireless LAN interface 16, and a wire LAN interface. Each of the communication interfaces comprises a power switch which can switch ON/OFF an electrification state with the power source section, and a power control device which controls an ON/OFF operation of the power switch based on a control signal from the CPU. The CPU detects unused one of the communication interfaces and supplies a control signal to switch an ON state of the power switch to an OFF state through the PCI bus to the power control device of the unused communication interface. A reduction in size of a power source section to miniaturize a wireless LAN access point, and power/energy saving are achieved.

14 Claims, 9 Drawing Sheets

U.S. PATENT DOCUMENTS

2004/0066789 A1* 4/2004 Kobayashi .................. 370/402
2004/0097265 A1* 5/2004 Cadieux et al. ............. 455/557

FOREIGN PATENT DOCUMENTS

| JP | 11-88458 A | 3/1999 |
| JP | 11-331247 A | 11/1999 |
| JP | 3097137 B2 | 8/2000 |
| JP | 2001-156788 A | 6/2001 |
| JP | 2002-111905 A | 4/2002 |
| JP | 2002-111927 A | 4/2002 |
| JP | 2002-209014 A | 7/2002 |

* cited by examiner

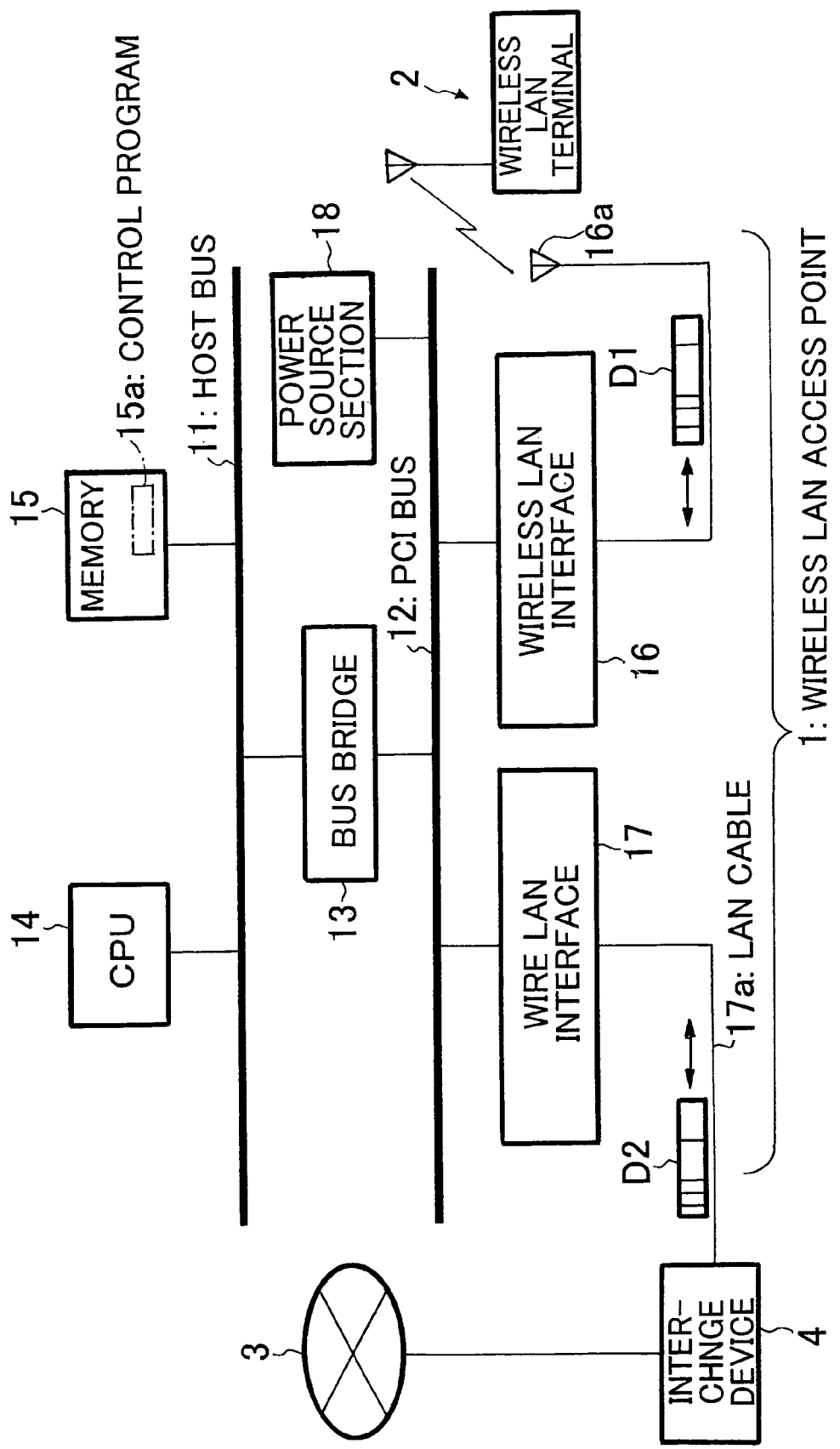

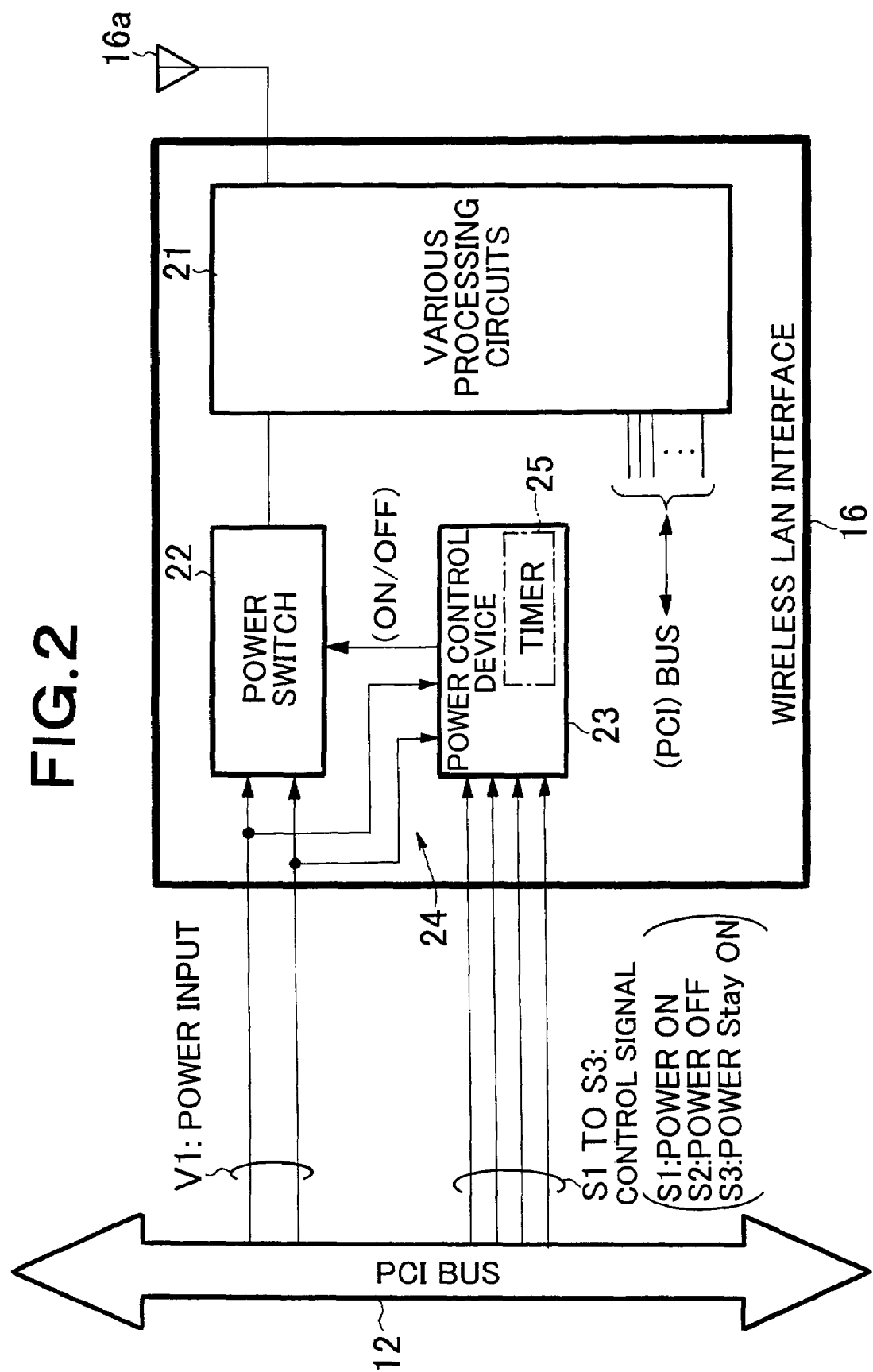

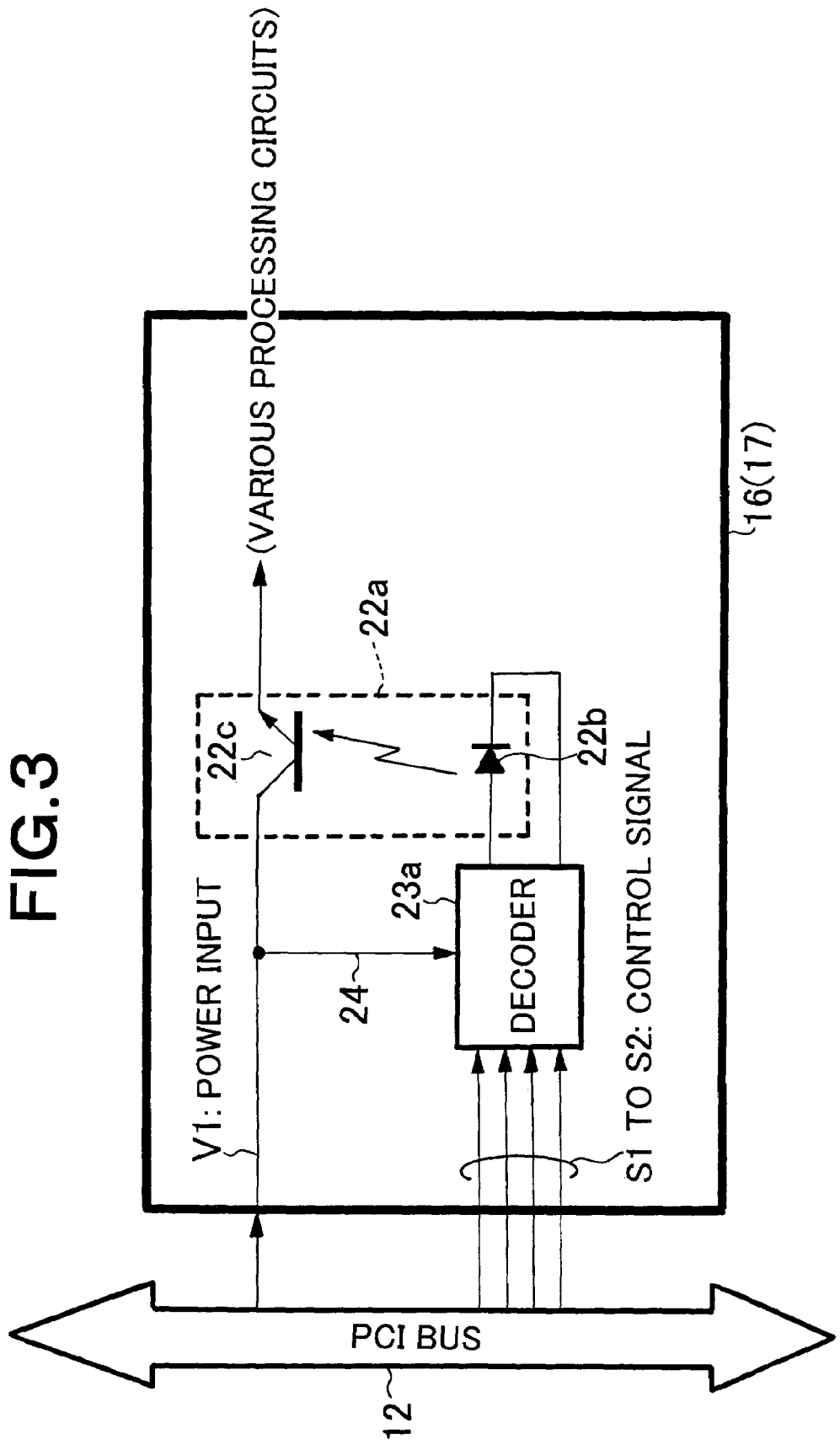

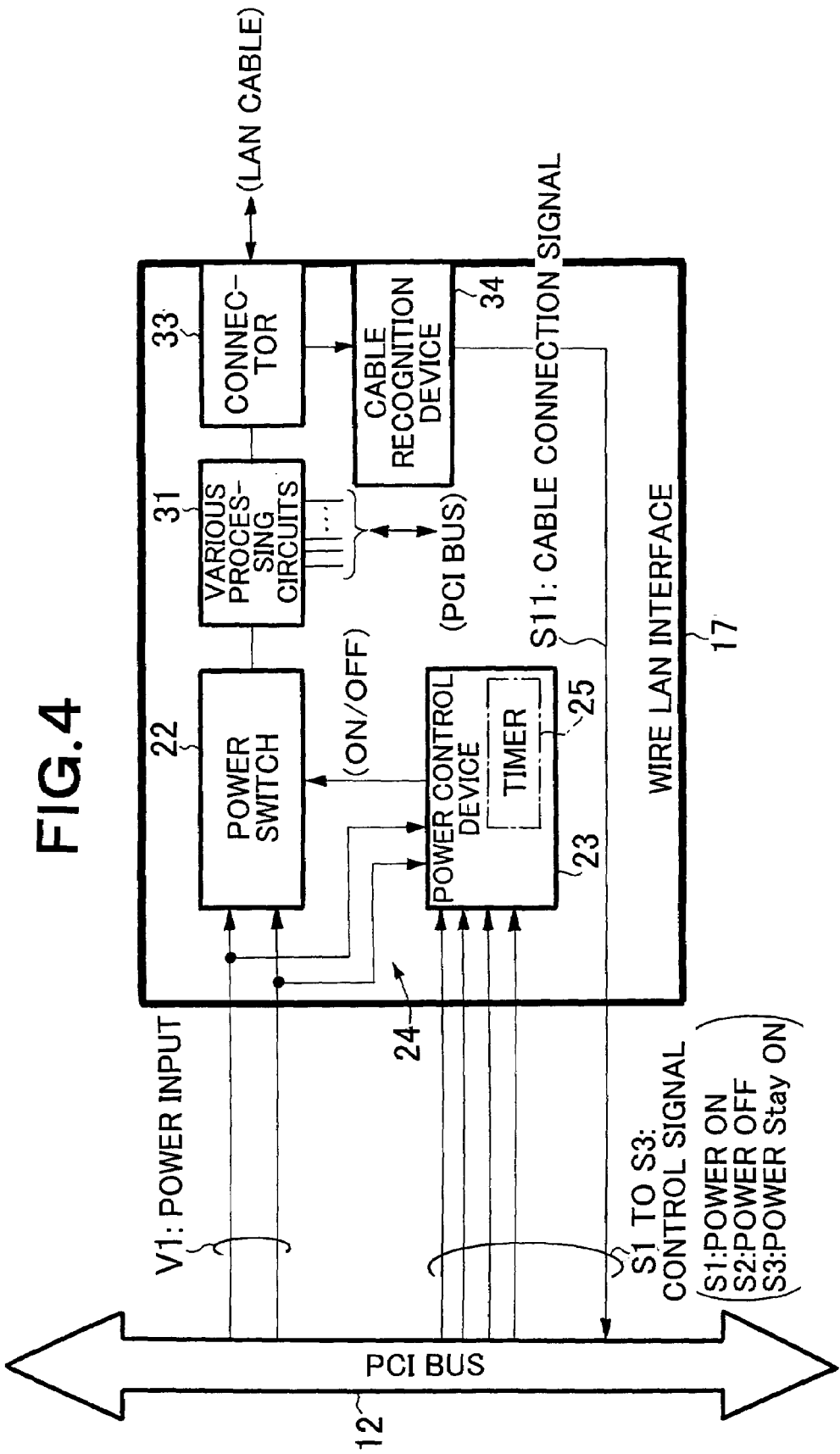

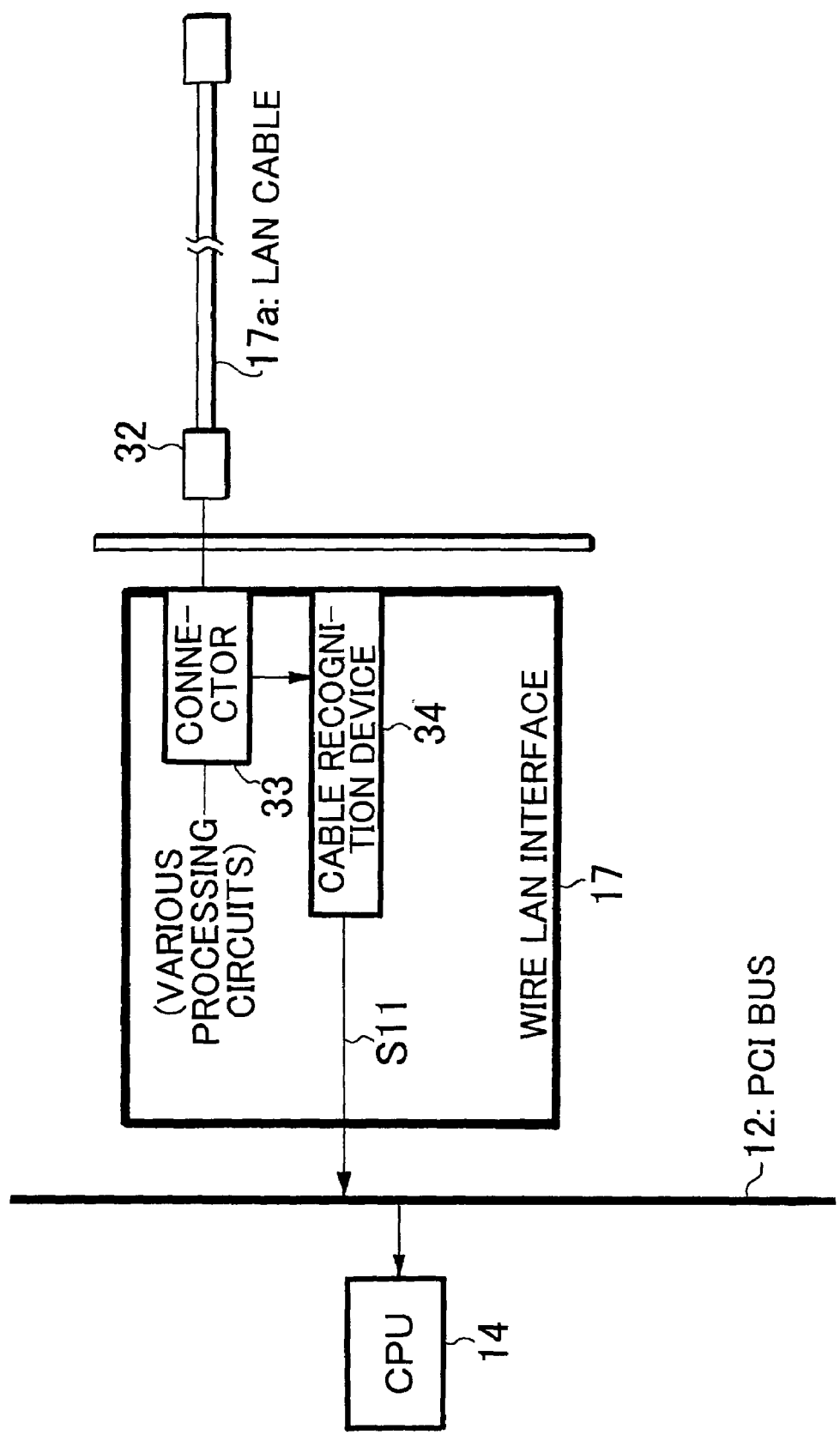

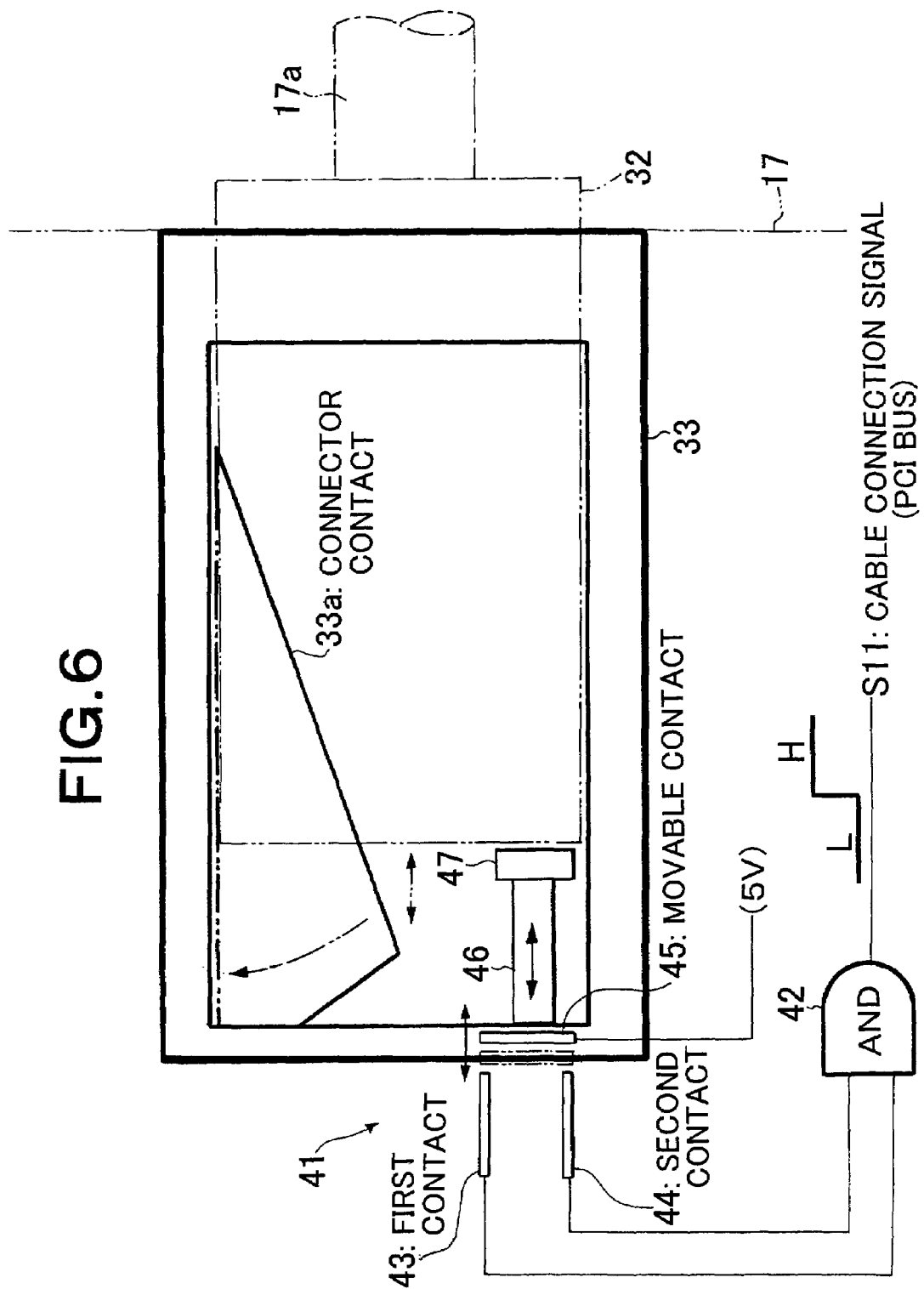

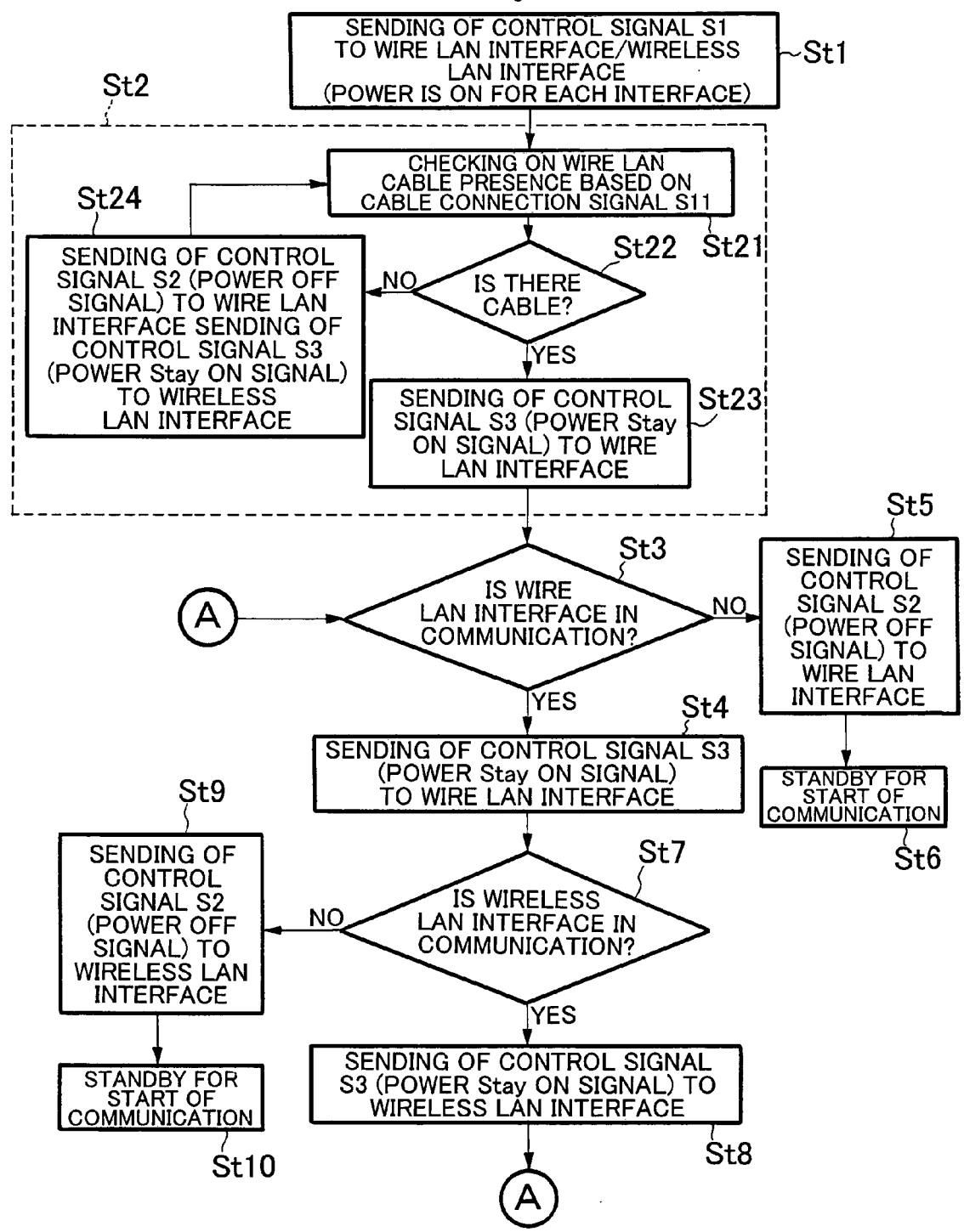

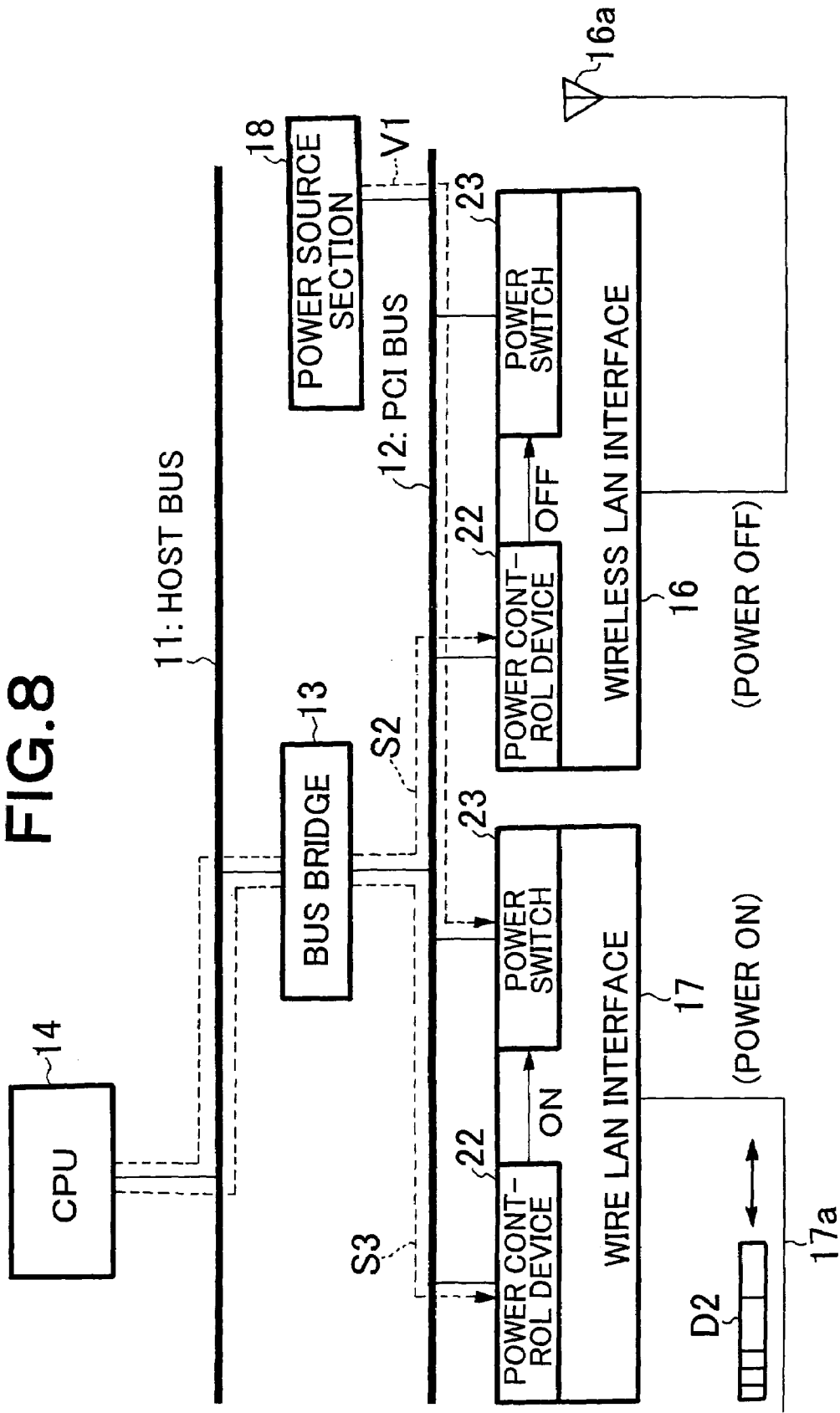

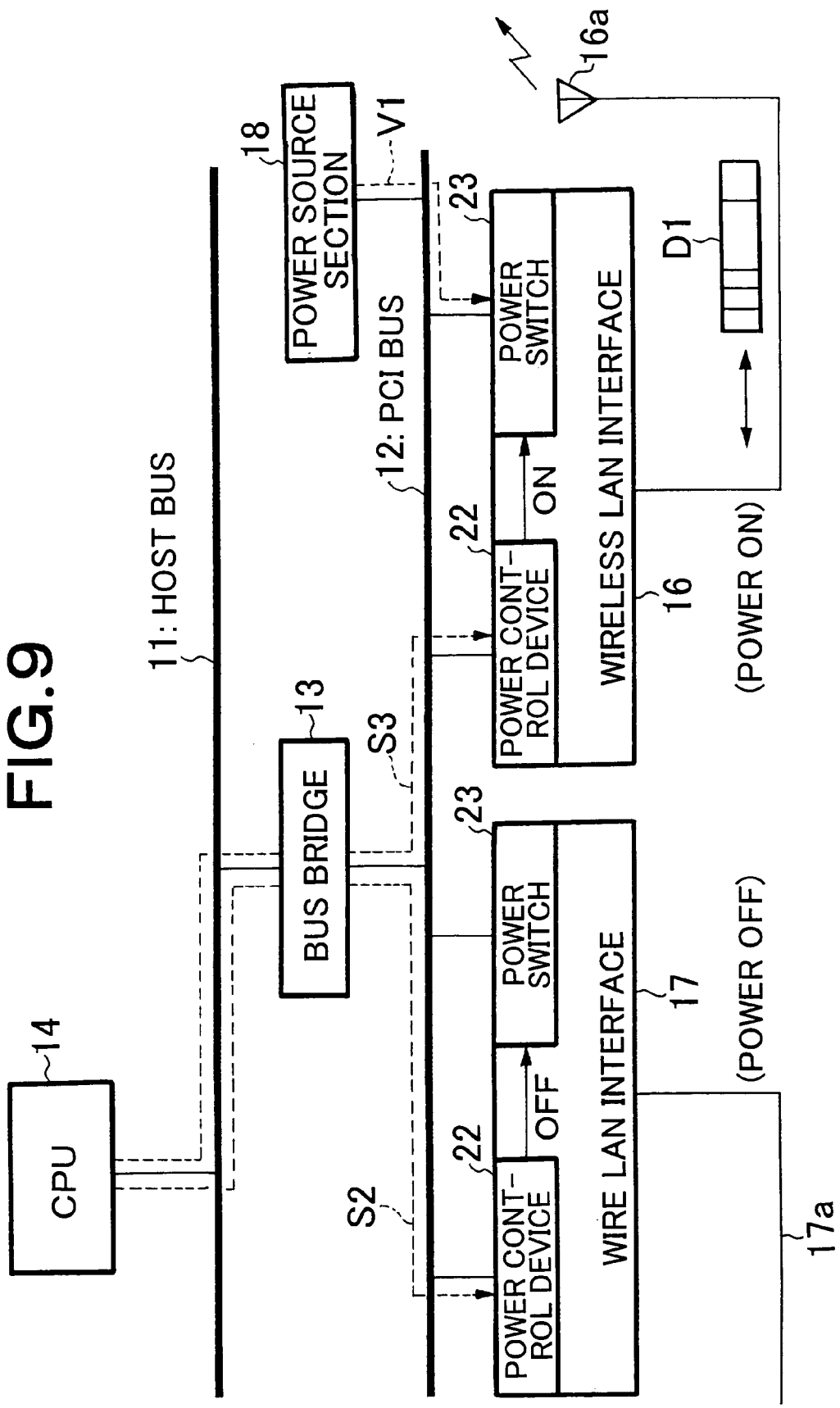

METHOD OF CONTROLLING POWER BY A POWER CONTROLLER CONTROLLING A POWER SWITCH OF AN UNUSED COMMUNICATION INTERFACE

BACKGROUND OF THE INVENTION

1. Field of the Invention

The present invention relates to a communication device on which a plurality of communication interfaces are mounted, and a wireless LAN (Local Area Network) access point which uses the same. More particularly, the invention relates to power ON/OFF control of a wireless LAN interface connected to a PCI (Peripheral Component Interconnect) bus of a communication device which constitutes a wireless LAN access point, and wire LAN interface.

2. Description of the Related Art

In recent years, with regard to use forms of LAN, an increase in use of a communication network represented by Internet has been accompanied by an upsurge in use of a wireless LAN in addition to a wire LAN which has conventionally been used. In the case of the wireless LAN, a wireless LAN access point is arranged at a contact between the wireless LAN and the other communication network (wire LAN), and a user can carry out communications through the other communication network via the access point from a wireless LAN terminal.

As the use of the wireless LAN is increased, the number of terminals used in a service area covered by one access point is increased to excessively raise a communication load and power consumption at the access point. Additionally, since the number of access point installation places is increased, there is a demand for utmost miniaturization of an access point to enable relatively free layout arrangement in limited space. However, to miniaturize the access point, a power source section must particularly be made compact, which makes essential energy/power saving measures at the access point.

Conventionally, as such power saving technologies of the communication devices, there have been presented a portable communication terminal which comprises means for turning interface power OFF by selectively switching a wireless communication interface and a wire communication interface for nonuse (see JP-3097137), and a modem which can prevent power consumption which is more than necessary by releasing a channel with a device at an exchange when a subscriber terminal is in an unconnected state, and its control method (see JP-A-2002-111905).

However, the aforementioned conventional power saving technologies of the communication devices are not necessarily designed for application to the wireless LAN access point. Thus, the problems of a reduction in size of the power source section to miniaturize the wireless LAN access point, and power/energy saving still remain to be solved.

SUMMARY OF THE INVENTION

The present invention is designed to deal with such conventional problems, and an object of the invention is to achieve a reduction in size of a power source section to miniaturize a wireless LAN access point, and power/energy saving.

In order to achieve the foregoing object, there is provided a communication device according to the present invention comprising: a bus of a predetermined standard; a power source connected to the bus; a plurality of communication interfaces connected to the bus to communicate data with the other communication device, each of the communication interfaces comprising a power switch for switching an electrical ON and OFF states with the power source, and a power controller for controlling the ON and OFF states of the power switch based on a predetermined control signal supplied through the bus; and a processor connected to the bus, the processor comprising detecting means for detecting unused one of the plurality of communication interfaces, and controlling means for, when the unused communication interface is detected by the detecting means, supplying a control signal to the OFF state thereof through said bus to the power controller of the unused communication interface, thereby switching the ON state of the power switch.

The control means may supply a control signal to the power controller of the communication interface other than the unused communication interface, thereby maintaining the ON states of the power switch via said bus.

Each of the plurality of communication interfaces may further comprise a power supply line to maintain the ON and OFF states between the power source and the power controller while the power switch is under the OFF state.

The power controller may switch the ON state of the power switch to the OFF state thereof while the control signal is not received for a predetermined time.

The power switch may comprise a light emitting device for converting an electric signal into an optical signal to emit the same based on control by said power controller; and a switching device for converting the optical signal emitted from the light emitting device into an electric signal to receive the same, and for switching the ON and OFF state with the power source in accordance with the electric signal.

The light emitting device and the switching device may be integrally mounted on a photo-coupler.

The plurality of communication interfaces may further comprise a wire LAN interface and a wireless LAN interface connected to the bus.

The detection means may comprise a cable recognition device which recognizes a cable connected state of the wire LAN interface, and means for detecting whether the wire LAN interface can be used or not based on a recognition result from the cable recognition device.

The bus is, for example, a peripheral component interconnect (PCI) bus. The processor is, for example, a Central Processing Unit (CPU).

According to one aspect of the present invention, there is provided a wireless LAN access point comprising: a bus of a predetermined standard; a power source connected to the bus; a plurality of communication interfaces including a wire LAN interface connected to the bus and a wireless LAN interface connected to the bus, the plurality of communication interfaces which are connected to the bus to communicate data with the other communication device, each of the communication interfaces comprising a power switch for switching an electrical ON and OFF states with the power source, and a power controller for controlling the ON and OFF states of the power switch based on a predetermined control signal supplied through the bus; and a processor connected to said bus, the processor comprising detecting means for detecting unused one of the plurality of communication interfaces, and controlling means for, when the unused communication interface is detected by the detecting means, supplying a control signal to the power controller of the unused communication interface, thereby switching the ON state of the power switch to the OFF state thereof through the bus.

BRIEF DESCRIPTION OF THE DRAWINGS

FIG. 1 is a schematic block diagram showing a configuration of an entire system which includes a wireless LAN access point of the present invention.

FIG. 2 is a schematic block diagram showing a constitutional example of a wireless LAN interface.

FIG. 3 is a schematic block diagram showing a constitutional example of a power switch and a power control device.

FIG. 4 is a schematic block diagram showing a constitutional example of a wire LAN interface.

FIG. 5 is a schematic diagram showing a relation between the wire LAN interface and a LAN cable.

FIG. 6 is a schematic diagram showing a constitutional example of a cable recognition device.

FIG. 7 is a schematic flowchart showing a processing sequence of a CPU.

FIG. 8 is a view illustrating an operation when power of a wire LAN cable is ON, and power of a wireless LAN cable is OFF.

FIG. 9 is a view illustrating an operation when power of the wire LAN cable is OFF, and power of the wireless LAN cable is ON.

DESCRIPTION OF THE PREFERRED EMBODIMENTS

Next, description will be made of a communication device on which a plurality of communication interfaces are mounted according to a preferred embodiment of the present invention with reference to FIGS. 1 to 9.

FIG. 1 schematically shows an entire system which includes a wireless LAN access point (referred to as "access point", hereinafter) constituted of a communication device of the embodiment on which a plurality of communication interfaces are mounted.

An access point 1 shown in FIG. 1 is arranged at a contact between a wireless LAN and a wire LAN to function as a bridge for data transmission between a wireless LAN terminal 2 and a interchange device 4 such as a router connected to a communication network 3, e.g., Internet, and comprises a computer such as a server machine which uses a personal computer (PC, including a notebook PC and so on) based on, for example, a standard PC architecture. The wireless LAN terminal 2 comprises, as an example, a wireless LAN card which can be pulled in/out through a card slot of a predetermined standard of a portable information terminal such as a notebook PC or a personal digital assistant (PDA). Other constitutional examples to which the invention can be applied include an adaptor type which can be separately attached, a type integrally mounted in a terminal, etc.

In the hardware constitutional example of FIG. 1, the access point 1 has a bus configuration in which a host bus 11 and a peripheral component interconnect (PCI) bus 12 are connected to each other through a bus bridge (host-PCI bus bridge) 13, and a central processing unit (CPU) 14 and a memory 15 are connected to the host bus 11 while a wireless LAN interface 16 which has a communication antenna 16a, and a wire LAN interface 17 are connected to the PCI bus 12. A LAN cable 17a is connected to a connector (described later) of the wire LAN interface 17 so as to be pulled out. In the example of FIG. 1, both interfaces 16, 17 are installed one each. However, this is only a schematic example, and the invention is not limited to one each in number. Two or more may be installed for each.

Other components connected to the PCI bus 12 are a power source section 18 which supplies a power supply voltage V1 (e.g., 5 V, or 3.3 V), and various peripheral devices (external memory device such as a hard disk or a removable disk, a display device such as a liquid crystal display, and input/output (I/O) device such as an input device of a keyboard or a pointing device). A control program 15a executed by the CPU 14 can be set in the memory 15.

The CPU 14 plays a central role in overall control of the device. By executing the control program 15a in the memory 15 during its operation, the CPU 14 can control operations of the wireless LAN interface 16 and the wire LAN interface 17 through the PCI bus 12 in the example of FIG. 1. Especially, according to the embodiment, by executing the control program 15a, the CPU 14 can determine presence of communication data from both interfaces 16, 17 to detect unused states thereof, generate three kinds of control signals S1 (power ON command), S2 (power OFF command) and S3 (power Stay ON command) represented by, e.g., 4 bits, to control power ON/OFF operations of the interfaces 16, 17 based on a result of the detection, and supply the control signals S1 to S3 through the PCI bus 12 to the interfaces 16, 17.

The wireless LAN interface 16 comprises, e.g., a wireless LAN card, and can radio-communicate various data D1 of predetermined data formats with the wireless LAN terminal 2 by a wireless LAN compliant with a communication protocol of a standard (IEEE 802.11) under control of the CPU 14. FIG. 2 shows a constitutional example of the wireless LAN interface 16.

The wireless LAN interface 16 shown in FIG. 2 comprises various processing circuits (e.g., a power amplifier, a radio frequency (RF)-intermediate frequency (IF) converter, an IF mode, a baseband processor, a media access controller, etc.) 21 which execute various processes for the wireless LAN compliant with the communication protocol of the standard (IEEE 802.11) through the communication antenna 16a, a power switch 22 which supplies a power supply voltage V1 through the PCI bus 12 from the power source section 18 to various processing circuits 21 so as to switched ON/OFF, a power control device 23 which controls an ON/OFF operation of the power switch 22 based on the control signals S1 to S3 from the CPU 14, and a power supply line 24 which constitutes a bypass dedicated pattern for independently supplying the power supply voltage V1 to the power control device 23 through the PCI bus 12 even while the power switch 22 is OFF. As another component, a timer 25 is incorporated in the power control device 23.

FIG. 3 shows a circuitry example of the power switch 22 and the power control device 23.

In the example of FIG. 3, the power switch 22 comprises a photo-coupler (photo-isolator) 22a which is constituted of a pair of a light emitting device and a light receiving device. A light emitting diode 22b is disposed as the light emitting device, while a phototransistor 22c is disposed as the light receiving device. The phototransistor 22c functions as a switching device. A collector electrode is connected to an input terminal of the power supply voltage V1, and an emitter electrode is connected to a power input side of each of various processing circuits 21. A collector current is controlled between the collector and the emitter by converting an optical signal emitted from the light emitting diode 22b into a base current (voltage between the base and the emitter) to receive it by a light receiving side (base electrode). Accordingly, it is possible to switch ON (conductive state)/OFF (nonconductive state) between the power source section 18 and each of various processing circuits 21.

The power control device 23 is constituted by mounting a decoder 23a, and its input side is connected to an input terminal which receives the control signals S1 to S3 of the CPU 14 while its output side is connected to both electrodes of the light emitting diode 22b. The decoder 23a decodes (recognizes) the 4-bit control signals from the CPU 14, i.e., commands of power ON (control signal S1), power OFF (control signal S2) and power Stay ON (control signal S3), and carries out an operation (output ON/OFF switching operation) of controlling a voltage (current) between both electrodes of the light emitting diode 22b based on a result of the decoding as follows. 1) If the result of decoding indicates a power ON command, light emission by the light emission diode 22b is started (as a result, the phototransistor 22c is switched ON). 2) If the result of decoding indicates a power OFF command, light emission by the light emitting diode 22b is stopped (the phototransistor 22c is switched OFF). 3) If the result of decoding indicates a power Stay ON command, light emission by the light emitting diode 22b is continued (the phototransistor 22c is kept ON).

The wire LAN interface 17 comprises, e.g., a LAN card or a LAN board compliant with Ethernet (registered trademark). Under control of the CPU 14 and through the LAN cable 17a connected to its connector (described later) and the interchange device 4 such as the router, the wire LAN interface 17 can communicate various data D2 with a communication interface 3 such as Internet based on a LAN protocol such as Ethernet (registered trademark) which defines a first layer (physical layer), a second layer (data link layer) of an OSI (Open Systems Interconnection) reference model, and a communication protocol such as a TCP(transmission control protocol)/IP(Internet protocol) which defines a third layer (network layer), a fourth layer (transport layer) which are upper layers. Each of FIGS. 4 and 5 shows a constitutional example of the wire LAN interface 17.

The wire LAN interface 17 shown in FIGS. 4 and 5 comprises, in addition to a power switch 22 (photo-coupler 22a), a power control device 23 (decoder 23a), and a timer 25 as in the case of the constitution shown in FIGS. 2 and 3, various processing circuits (transmission section, reception section, buffer, control section etc.) 31 which carry out various processes compliant with a LAN protocol of Ethernet (registered trademark) standard, a female side connector (socket) 33 which makes a pair with a male side connector (plug) 32 of a predetermined standard (e.g., 8 pin type) of the LAN cable 17a, and pulls out/in the connector 32 to enable connection, and a cable recognition device 34 which recognizes (detects) a connected/disconnected state by pulling out/in the LAN cable 17a with respect to the connector 31.

As in the case of the power supply line 24 connected to the power control device 23, a power supply line (not shown) is connected to the cable recognition device 34 to enable its operation even while the power switch 22 is OFF.

FIG. 6 shows s constitutional example of the connector 33 and the cable recognition device 34. In the example of FIG. 6, the cable recognition device 34 comprises a button type switch 41 arranged on the connector 33 side, and an AND gate connected to the button type switch 41. An output terminal of the AND gate 42 is connected to a PCI bus 12.

The button type switch 41 comprises a first contact 43, a second contact 44 connected to a 2-input terminal of the AND gate 42, a movable contact 45 which switches ON/OFF between the contacts 43, 44, and a button head 47 which presses the movable contact 45 to the contacts 43, 44 through a stretchable elastic member 46 such as a spring. An input terminal of a power supply voltage V1 (e.g., 5 V) is connected to the movable contact 45. According to this structure, if the LAN cable 17a is inserted along the connector contact 33a in the connector 33, the button head 47 is pressed to the tip side of the connector 32 of the LAN cable 17a in the connector 33. By the pressing force, the movable contact 45 is moved through the elastic member 46 into contact with the first contact 43, the second contact 44. Accordingly, power is switched ON between the contacts 43, 44 through the movable contact 45 to supply the power supply voltage V1. On the other hand, if the LAN cable 17a is pulled out of the connector 33, since the pressing force of the button head 47 is released, the movable contact 45 is separated from the first contact 43, the second contact 44 to return to its original position. As a result, power is turned OFF between the contacts 43, 44 to prevent supplying of the power supply voltage V1.

The AND gate 42 determines logical levels of input signals from the first contact 43, the second contact 44, and sends a cable connection signal S11 which is an AND signal thereof through the PCI bus 12 to the CPU 14. In this case, the cable connection signal S11 indicates a logical HIGH level when the logical levels of the input signals from the first contact 43, the second contact 44 are both determined to be HIGH levels (e.g., 5 V), and a logical LOW level when one of the input signals is determined to be a LOW level (e.g., 0 V). By this cable connection signal S11, the CPU 14 can detect a connected/disconnected state of the LAN cable 17a with respect to the wire LAN interface 17.

Next, an operation of the embodiment will be described with reference to FIGS. 7 to 9.

FIG. 7 is a flowchart showing a processing sequence when the control program 15a is executed by the CPU 14. Referring to FIG. 7, at the starting time of the system, first, the CPU 14 sends the control signal S1 (power ON) to turn ON the power switches 22, 22 through the PCI bus 12 to the power control devices 23, 23 so that all the communication interfaces, i.e., the wireless LAN interface 16 and the wire LAN interface 17, can be set in communicable states (step St1).

Then, the CPU 14 executes processing to detect a connected/disconnected state of the LAN cable 17a of the wire LAN interface 17 (step St2). In this processing, first, the cable connection signal S11 is requested to the cable recognition device 34 of the wire LAN interface 17. Checking is made on a connected/disconnected state of the LAN cable 17a of the wire LAN interface 17 based on a logical level (see the above) of the cable connection signal S11 sent through the PCI bus 12 from the cable recognition device 34 in response to the request (step St21), and accordingly determination is made on whether there is a cable or not (step St22).

If a result of the determination is YES (there is a cable), since the wire LAN interface 17 is in a communicable state (usable), the control signal S3 which indicates a power Stay ON command is sent through the PCI bus 12 to the power control device 23 (step St23), and then next processing is started (steps St3 to St10). Thus, the power switch 23 of the wire LAN interface 17 is kept ON.

On the other hand, in the case of NO (there is no cable), since the wire LAN interface 17 is not in a communicable state, the control signal S2 which indicates a power OFF command is sent to the power control device 23, and simultaneously the control signal S3 which indicates a power Stay ON command is sent to power control device 23 of the wireless LAN interface 16 (step St24). Accordingly, the power switch 23 of the wire LAN interface 17 is switched from ON to OFF, while the power switch 23 of the wireless LAN interface 16 is kept ON. The ON state of the wireless LAN interface 16 is maintained when there is no cable in the wire LAN interface 17 in order to prevent a loss of radio data therebetween. Then, the process returns to step St21 to repeat an operation similar to the above.

After step St24 (at a point of this time, the power switches 22 of the wireless LAN interface 16 and the wire LAN interface 17 are both kept ON), monitoring (detection) is made as to whether the interfaces 16, 17 are in communication (being used) or not based on communication situations (presence of communication data) thereof. If they are in communication, the control signal S3 which indicates a power Stay ON command is sent to the power control device 22 in order to maintain the ON state of the power switch 23. If not in communication, i.e., unused, the control signal S2 which indicates a power OFF signal is sent to the power control device 22 in order to turn OFF the power switch 22, and the process proceeds to a communication standby state (steps St3 to St10).

Accordingly, the power switches 23 of the used interfaces 16, 17 are kept ON, while the power switches 23 of the unused interfaces 16, 17 are switched from ON to OFF. If it is determined from the timer 25 installed in the power control device 22 that no control signals S1 to S3 from the CPU 14 are received by the power control device 22 for a predetermined time, processing similar to that in the case of receiving the control signal S2 (power OFF) is carried out to switch the power switch 23 from ON to OFF.

FIG. 8 shows a situation in which by the process of steps St3 to St10, the power switch 23 of the wireless LAN interface 16 is switched from ON to OFF because of its nonuse, while the power switch 23 of the wire LAN interface 17 is kept ON because of its on-going use.

On the contrary, FIG. 9 shows a situation in which by the process of steps St3 to St10, the power switch 23 of the wireless LAN interface 16 is kept ON because of its on-going use, while the power switch 23 of the wire LAN interface 17 is switched from ON to OFF because of its nonuse.

Thus, according to the embodiment, at the wireless LAN access point to which the PC configuration is applied, the wire LAN interface and the wireless LAN interface comprise the power control devices, the power of each interface is automatically controlled and, especially when an unused interface is detected, the power of the unused interface is automatically turned OFF by the power control device. Accordingly, a maximum load applied on the PC power source section which constitutes the wireless LAN access point is greatly reduced to enable achievement of power/energy saving and a greater reduction in size of the power source section. Thus, it is possible to greatly reduce the size of the wireless LAN access point. As a result, restrictions on installation space are softened to enable setting of access points at various places by a freer layout.

A secondary effect is an advantage that since control is executed to maintain the ON state of the radio interface when there is no cable in the wire interface, a loss of radio data can be prevented. Additionally, according to the embodiment, since the standard PC configuration which uses the PCI bus is employed for the wireless LAN access point, extendability of the communication interface such as a LAN interface is greatly improved, and an additional effect is expected in which freedom for designing can be increased.

The embodiment has been described by taking the example of the wireless LAN access point as the communication device on which the plurality of communication interfaces are mounted. However, this example is not limitative of the present invention. The invention can be applied to other communication devices as long as a constitution is employed in which a plurality of communication interfaces are connected to a standardized bus such as a PCI bus, and control signals or data can be transferred with the CPU through the bus.

The embodiment has been described by taking the example of the wireless LAN interface and the wire LAN interface as the plurality of communication interfaces connected to the PCI bus. However, this example is not limitative of the present invention. The invention can be applied to the other wire interfaces (e.g., general-purpose modem card connected to a public line such as a telephone line or an ISDN), and the other radio interfaces (e.g., communication modem card for a portable telephone or a PHS).

According to the embodiment, the PCI bus is employed as the bus configuration. However, this example is not limitative of the present invention. The invention can be applied to other standardized buses as long as a constitution is employed in which a plurality of communication interfaces are connected, and control signals or data can be transferred with the CPU.

Furthermore, the embodiment illustrates the configuration in which the photo-coupler and the decoder are used as the power switch and the power control device, and the configuration in which the button type switch and the AND gate are used as the cable recognition device. However, these constitutions are not limitative of the present invention. The invention can be applied to other circuitry as long as substantially similar functions are realized.

The present invention is not limited to the foregoing embodiment which is only an example. As apparent to those skilled in the art, various changes and modifications can be made based on contents described in appended claims without departing from the teachings. Such changes and modifications are also within the claims of the present invention.

As described above, according to the present invention, a maximum load applied on the power source section is reduced to achieve power/energy saving and a reduction in size of the power source section. Thus, it is possible to reduce the size of the wireless LAN access point.

What is claimed is:

1. A communication device comprising:

a bus of a predetermined standard;

a power source connected to said bus;

a plurality of communication interfaces connected to said bus to communicate data with the other communication device, each of said communication interfaces comprising a power switch for switching an electrical ON and OFF states with said power source, and a power controller for controlling the ON and OFF states of said power switch based on a predetermined control signal supplied through said bus; and a processor connected to said bus, said processor comprising detecting means for detecting unused one of the plurality of communication interfaces, and controlling means for, when said unused communication interface is detected by said detecting means, supplying a control signal to said power controller of said unused communication interface, thereby switching the ON state of said power switch to the OFF state thereof through said bus.

2. The communication device according to claim 1, wherein said controlling means supplies a control signal to the power controller of the communication interface other than said unused communication interface, thereby maintaining the ON states of said power switch via said bus.

3. The communication device according to claim 1, wherein each of said plurality of communication interfaces further comprises a power supply line to maintain the ON and OFF states between said power source and said power controller while said power switch is under the OFF state.

4. The communication device according to claim 1, wherein said power controller switches the ON state of said power switch to the OFF state thereof while the control signal is not received for a predetermined time.

5. The communication device according to claim 1, wherein said power switch comprises:
 a light emitting device for converting an electric signal into an optical signal to emit the same based on control by said power controller; and
 a switching device for converting the optical signal emitted from said light emitting device into an electric signal to receive the same, and for switching the ON and OFF state with the power source in accordance with the electric signal.

6. The communication device according to claim 5, wherein said light emitting device and said switching device are integrally mounted on a photo-coupler.

7. The communication device according to claim 1, wherein said plurality of communication interfaces further comprises:
 a wire LAN interface connected to said bus; and
 a wireless LAN interface connected to said bus.

8. The communication device according to claim 7, wherein said detecting means comprises:
 a cable recognition device which recognizes a cable connected state of said wire LAN interface; and
 means for detecting whether said wire LAN interface can be used or not based on a recognition result from the cable recognition device.

9. The communication device according to claim 1, wherein said bus is a peripheral component interconnect (PCI) bus.

10. The communication device according to claim 1, wherein said processor is a Central Processing Unit (CPU).

11. A wireless LAN access point comprising:
 a bus of a predetermined standard;
 a power source connected to said bus;
 a plurality of communication interfaces including a wire LAN interface connected to said bus and a wireless LAN interface connected to said bus, said plurality of communication interfaces which are connected to said bus to communicate data with the other communication device, each of said communication interfaces comprising a power switch for switching an electrical ON and OFF states with said power source, and a power controller for controlling the ON and OFF states of said power switch based on a predetermined control signal supplied through said bus; and
 a processor connected to said bus, said processor comprising detecting means for detecting unused one of the plurality of communication interfaces, and controlling means for, when said unused communication interface is detected by said detecting means, supplying a control signal to the OFF state thereof through said bus to said power controller of said unused communication interface, thereby switching the ON state of said power switch.

12. The wireless LAN access point according to claim 11, wherein said power switch comprises:
 a light emitting device for converting an electric signal into an optical signal to emit the same based on control by said power controller; and
 a switching device for converting the optical signal emitted from said light emitting device into an electric signal to receive the same, and for switching the ON and OFF state with the power source in accordance with the electric signal.

13. The wireless LAN access point according to claim 12, wherein said light emitting device and said switching device are integrally mounted on a photo-coupler.

14. A communication device comprising: a bus;
 a power source connected to said bus;
 a plurality of communication interfaces connected to said bus, each of said communication interfaces comprising:
  a power switch; and
  a power controller for controlling ON and OFF states of said power switch based on a control signal supplied through said bus; and
 a processor connected to said bus, said processor comprising:
  a detector which detects at least one unused one of the plurality of communication interfaces; and
  a controller which supplies a control signal through said bus to said power controller of said unused communication interface thereby switching the ON state of said power switch to the OFF state thereof when said unused communication interface is detected by said detector.

* * * * *